ROBERT S. BOYLE — INVENTOR.

BY

ATTORNEYS

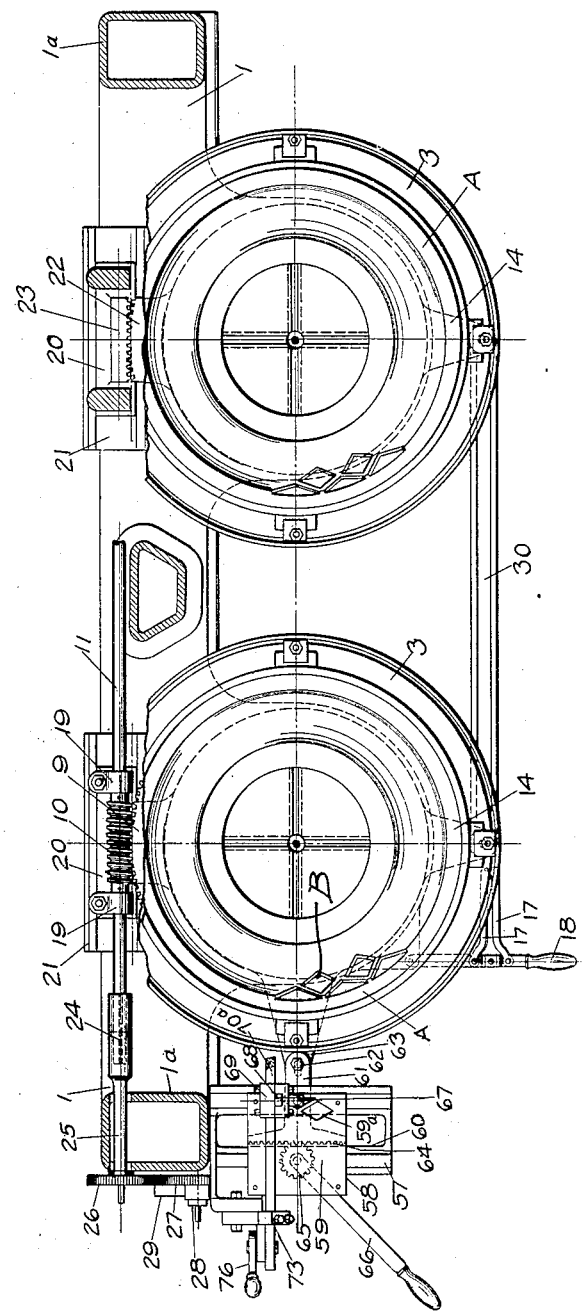

March 10, 1931.   R. S. BOYLE   1,796,079
MULTIPLE TIRE MOLD ENGRAVING MACHINE
Filed Dec. 14, 1925   6 Sheets-Sheet 5

ROBERT S. BOYLE—INVENTOR.

BY
ATTORNEYS

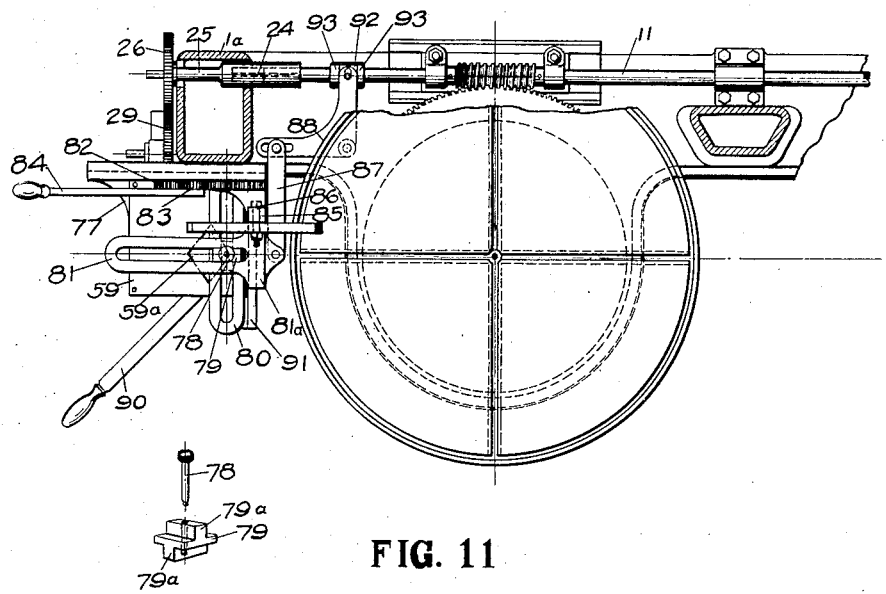
FIG. 11
FIG. 13
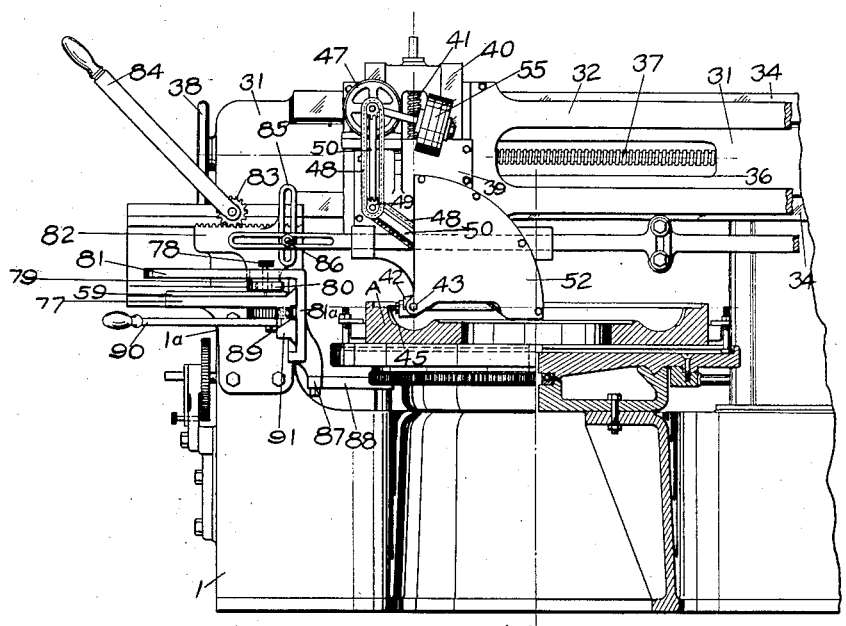
FIG. 12
ROBERT S. BOYLE - INVENTOR.

Patented Mar. 10, 1931

1,796,079

UNITED STATES PATENT OFFICE

ROBERT S. BOYLE, OF AKRON, OHIO

MULTIPLE-TIRE-MOLD-ENGRAVING MACHINE

Application filed December 14, 1925. Serial No. 75,243.

The present invention relates to a tire mold engraving machine, and has for one of its objects to provide a machine of this character which embodies novel features of construction, whereby it can be operated in tandem to engrave a plurality of tire molds at the same time. At the present time the tire molds are each cut or engraved separately, and since the engraving of a tire mold is an exacting and time consuming operation there is a great saving entailed where two or more of the tire molds are engraved at the same time.

A further object of the invention is to provide a tire mold engraving machine in which the movements of the cutter and tire mold are effectively controlled from the pattern plate, so that an accurate reproduction of the pattern is obtained upon the curved inner face of the mold.

The invention further contemplates an engraving mechanism which has a maximum degree of adjustment and can be arranged to cut a design upon the inner portion of the periphery of the annular cavity of the mold as well as upon the outer portion of the periphery thereof.

Means are also provided for counter-balancing the cutter mechanism so that the several cutter mechanisms can be readily operated and controlled from a single pattern plate.

The invention further provides means for adjustably connecting the various cutter mechanisms so that they can operate effectively upon tire molds which are at slightly different elevations, thereby enabling the machine to operate efficiently even though the tire molds may not set upon the turn-tables with entire uniformity.

While two particular forms and embodiments of the invention will be shown and described in detail for illustrative purposes, it will be understood that many modifications and changes can be made in the details of construction without departing from the spirit of the invention.

For a full understanding of the invention reference is to be had to the following description and accompanying drawings, in which Figure 1 is a front elevation of a tire mold engraving machine which is constructed in accordance with the invention, one of the tire molds being shown in section, and the position of the cutter when it is arranged to operate upon the inner periphery of the mold cavity being indicated by dotted lines.

Figure 4 is a top plan view of the machine with the cutters and cutter supporting carriages removed, the rear portion of the frame being broken away to illustrate more clearly the gear mechanism for advancing the turntables to successively bring different areas of the tire molds into position under the cutters.

Figure 11 is a top plan view of one end of a machine which embodies a modified construction, portions being broken away and shown in section.

Figure 12 is a front elevation thereof with parts broken away and shown in section.

Figure 13 is a detail view of the slide which operates within the slotted arms and also of the follower pin which is carried by the slide.

Corresponding and like parts are referred to in the following description and indicated on all of the views of the drawings by like reference characters.

Figure 1:
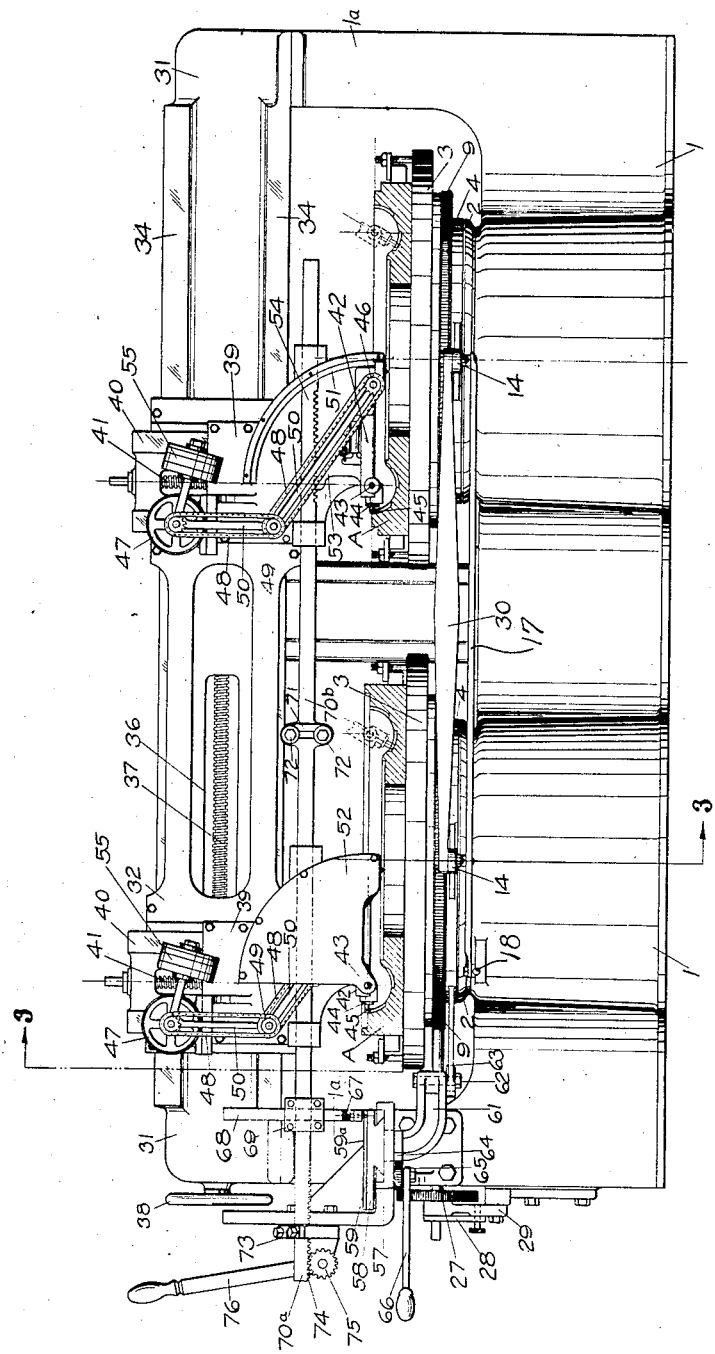
Figure 2:
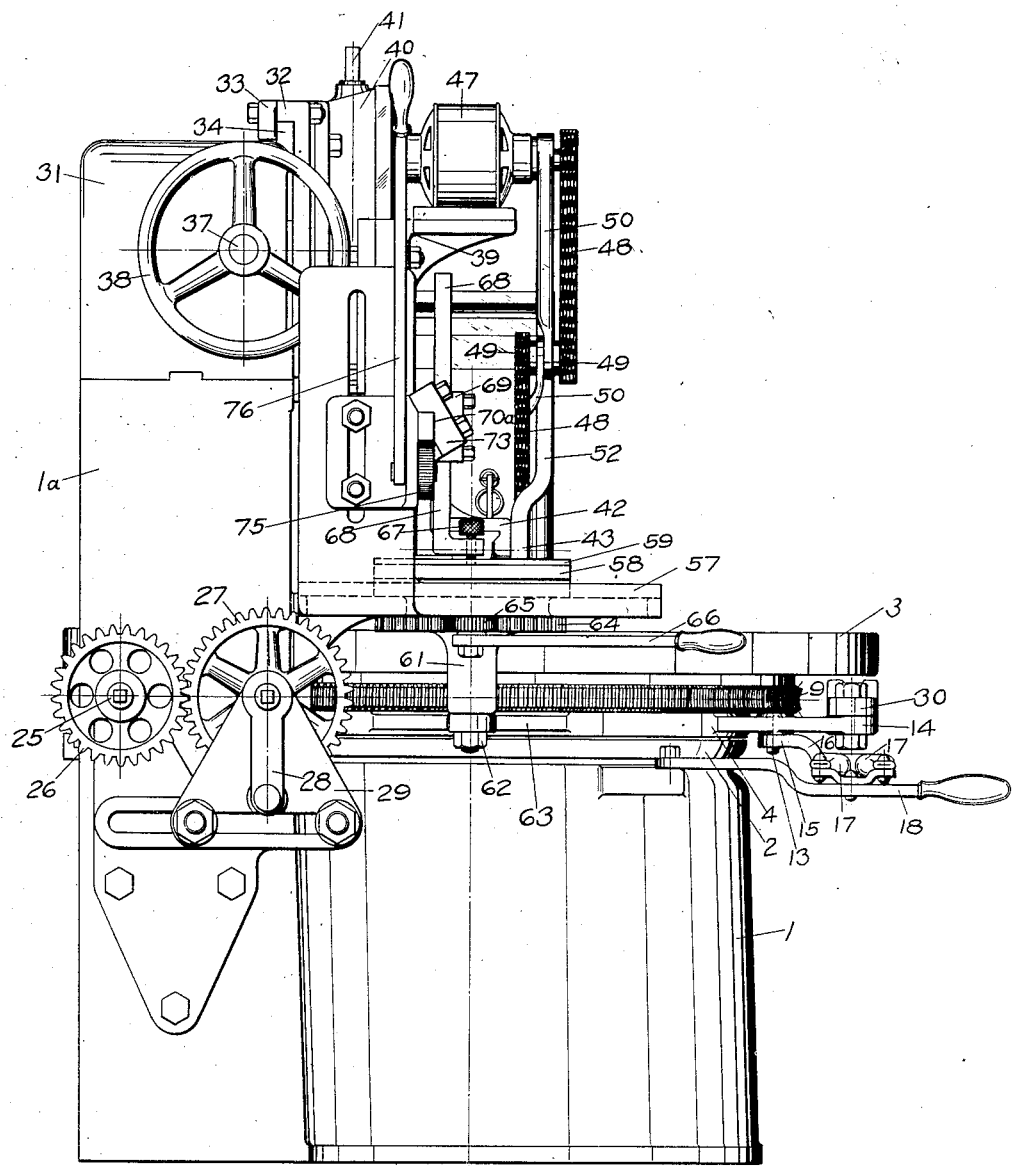
Figure 2 is an end view of the machine.
Figure 3:
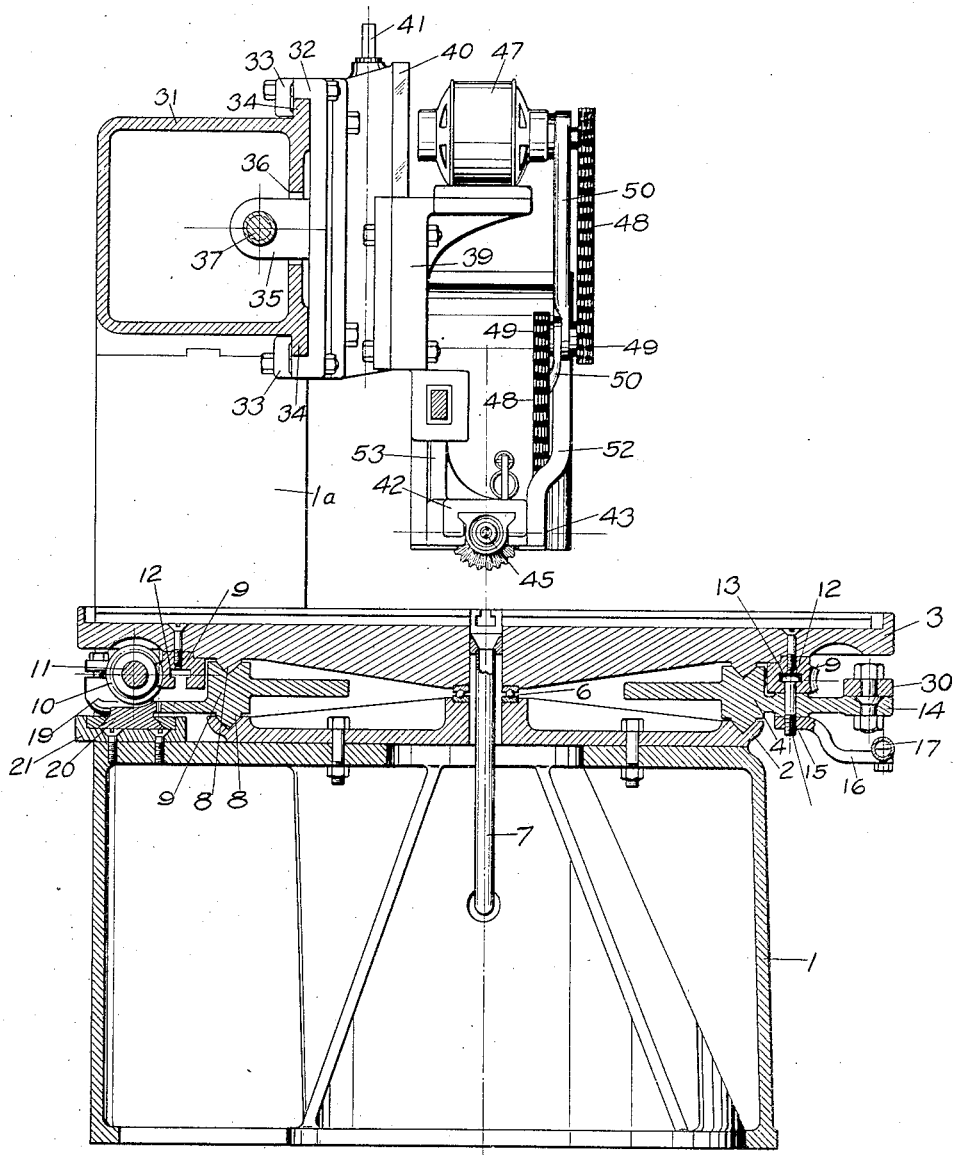
Figure 3 is a transverse sectional view through the machine, taken on the line 3—3 of Figure 1, and looking in the direction of the arrows.
Figure 6:
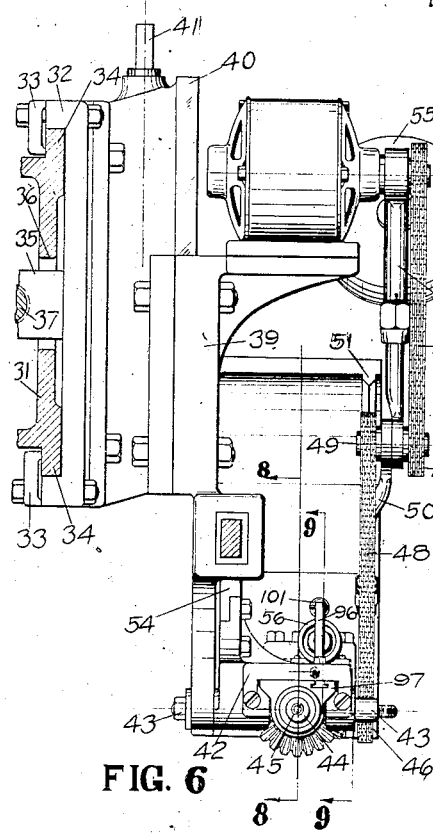
Figure 6 is an end view thereof.
Figure 5:
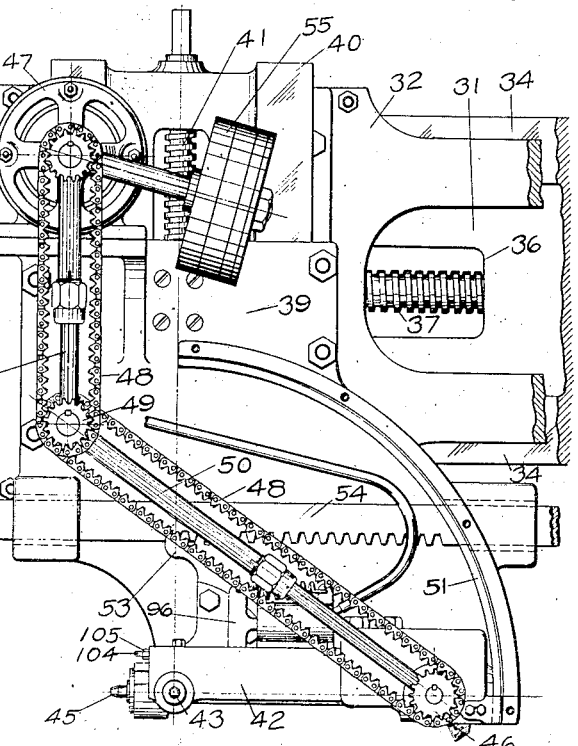
Figure 5 is an enlarged elevation of one of the cutting mechanisms, the segmental cover plate being removed.

Referring to the drawings the numeral 1 designates the main supporting frame of the tire mold engraving machine, said frame being suitably elongated to provide supports for any desired number of work supporting tables, depending upon the number of tire molds or analogous articles which it may be desired to engrave or cut at a single operation. In the present instance the machine is constructed for engraving two tire molds at a single operation, and two circular bed plates 2 are shown as bolted or otherwise rigidly secured to the main frame. These bed plates are horizontally arranged and have turn-tables 3 arranged above the same, a bearing ring 4 being interposed between each of the bed plates and the corresponding turn-table. An anti-friction bearing 6 is interposed between the center of the turn-table and the bed plate and the numeral 7 designates the pipe for an oil drain system of any conventional character. Each turn-table 3 and bearing ring 4 is formed upon the lower face thereof with an annular V-shaped rib 8, the rib of the turn-table being loosely received within a corresponding depression in the upper face of the bearing ring, while the rib of the bearing ring is loosely received within a correspondingly shaped depression in the upper face of the bed plate.

A worm gear ring 9 is rigidly secured to the lower face of each of the turn-tables 3, and these worm gears mesh with worms 10 which are rigidly applied to a worm shaft 11 extending longitudinally of the main frame 1 at the back thereof. Each of the worm gear rings 9 is formed in the lower face thereof with an annular T-shaped slot 12 which receives the head of a clamping bolt 13, said clamping bolt extending through an opening formed in a lateral arm 14 projecting from the bearing ring 4. A nut 15 is threaded upon each of the clamping bolts, said nuts being formed with arms 16 which are connected by links 17 to a hand lever 18 arranged at one end of the machine. With this construction it will be obvious that when the hand lever is moved in one direction the nuts 15 will be tightened and the gear rings 9 clamped with the bearing rings. Since the gear rings are rigidly secured to the turn-tables 3 the latter can then be held rigid with the bearing rings. On the other hand when the hand lever 18 is moved in the opposite direction the nuts 15 will be loosened on the clamping bolts 13 and the gear rings released so that the turn-tables can move independently of the bearing rings.

Arranged at opposite ends of each of the worms 10 are bearings 19 within which the worm shaft 11 is journaled, said bearings being carried by slides 20 which are mounted to move within guide-ways 21. By reference to the right hand end of Fig. 4 it will also be observed that each of the bearing rings 4 is provided at the back thereof with a short segmental rack 22 meshing with a straight rack 23 on the corresponding slide 20, thereby holding the bearing rings against rotation when the turn-tables are adjusted, but permitting a limited back and forth oscillation thereof as the slides 20 move in the guide ways 21. One end of the worm shaft 11 has a feather and spline connection 24 with a shaft 25 of the indexing mechanism. This shaft has an indexing gear 26 applied to the end thereof, said indexing gear meshing with a master gear 27 which is adapted to be turned by means of a crank handle 28. The ratio of the gears is such that one complete revolution of the master gear 27 will rotate the turn-tables a sufficient amount to bring fresh portions of the mold surfaces into operative position. For this work it may be desired to use indexing gears 26 of various sizes, and the master gear 27 is carried by a slide 29 which can be adjusted to cause the teeth of the master gear to mesh in the proper manner with the teeth of an indexing gear 26 of any appropriate size which it may be found necessary to use.

The tire mold sections A or other articles to be cut or engraved are securely clamped in position on the turn-tables 3 in any suitable manner with the axes of the tire mold sections concentric with the pivot centers of the turn-tables. The forwardly projecting lateral arms 14 of the bearing rings 4 are connected by a rod 30 so that they must oscillate in unison, the degree of oscillation during the cutting action being controlled by the pattern plate, as will be hereinafter described, so that a cut of the desired configuration can be made in each of the mold sections. During the cutting operation the turn-tables 3 are securely clamped to the bearing rings 4 by means of the clamping bolts 13, and as the turn-tables oscillate the worm shaft 11 is reciprocated longitudinally and the slides 20 of the bearings 19 moved back and forth within the guide ways 21, said movement of the worm shaft being permitted by the feather and spline connection 24. When it is desired to advance the turn-tables to bring fresh portions of the tire molds in position under the cutters, the hand lever 18 is first actuated to loosen the clamping bolts 13 and release the connection between the turn-tables 3 and the bearing rings 4, after which the master gear 27 of the indexing mechanism is given one complete revolution, thereby operating through the worms 10 and worm gear rings 9 to rotate the turn-tables the required amount upon the bearing rings. The hand lever 18 is then again actuated to tighten the clamping bolts 13 and secure the turn-tables to the bearing rings preparatory to starting the cutting mechanism into operation.

The back of the main supporting frame 1 is formed with an upwardly projecting portion 1ª which supports a hollow horizontal rail portion 31. A main carriage 32 is mounted upon the rail 31 for movement in a horizontal direction, being shown as provided with clips 33 which slidably engage upwardly and downwardly projecting flanges 34 at the front of the rail 31. The carriage is formed with one or more lugs 35 which project into the interior of the hollow rail 31 through a slot 36 in the front of the rail. These lugs 35 have a threaded engagement with an adjusting shaft 37 which extends longitudinally through the rail 31, being journaled in suitable bearings and provided at the end thereof with a hand wheel 38. With this construction it will be obvious that the carriage 32 is movable along the horizontal rail 31 and can be set at any desired position thereon by manipulating the hand wheel 38.

The main carriage 32 is provided at suitable intervals with cutter carrying frames 39 which are mounted for vertical movement thereon. These cutter carrying frames 39 are mounted upon vertical guide ways 40 with which the main carriage is provided and are movable up and down by means of the vertical adjusting screws 41. The upper ends of these screws 41 are shown as provided with polygonal heads which may be engaged by a suitable wrench when it is desired to adjust the frames up and down. The cutter carrying frames 39 project downwardly below the main carriage 32 and have cutter arms 42 pivotally connected thereto at 43. A cutter shaft 44 is journaled in each of the cutter arms, one end of the shaft extending beyond the arm and terminating in a suitable cutting head 45, while the other end of the shaft is suitably geared to a sprocket wheel 46. This sprocket wheel receives power from an electric motor 47 which is mounted on the upper end of the cutter frame, the power being transmitted through sprocket chains 48 which engage intermediate sprocket wheels 49 which are carried by the swinging arms 50 and mounted upon the pivotal connection between the arms. The opposite ends of the swinging arms 50 are pivotally connected to the motor and cutter arm, respectively, and these arms will swing about their pivotal connections and maintain a driving connection between the motor and the cutter shaft at all positions of the cutter arm as the latter is rotated about its pivot 43.

The rear end of the cutter arm 42 slidably engages a segmental guide 51 which assists in directing the cutter arm in its movements, and a cover plate 52 is arranged over each of the cutter arms to provide a housing therefor. Carried by each of the cutter arms 42 is a segmental rack 53 which meshes with corresponding racks 54 on sections of a horizontally disposed bar which extends longitudinally of the device and has the reciprocating movements thereof governed by the pattern plate. It will be obvious that longitudinal movements of the racks 54 will operate through the segmental racks 53 to swing the cutter arms 42 and shift the position of the cutting heads 45. In order that this may be done with a minimum amount of energy the cutter arms and driving mechanisms therefor are counter-balanced by means of weights 55 applied to lateral arms which project from the upper ends of the upper swinging arms 50 of the power transmission mechanisms. Each of the cutter arms is provided with a suitable pneumatic cylinder 56 which operates in a manner well known in the art to advance the cutting head until a cut of the desired depth has been produced.

One end of the machine is provided with a transversely disposed guide-way 57 upon which a slide 58 is mounted, the pattern plate 59 being adapted to be rigidly secured to this slide in any suitable manner. The guide-way 57 has a longitudinal slot 60 in the bottom thereof, and a curved arm 61 which projects downwardly from the slide 58 extends through this slot and has the end thereof pivotally connected at 62 to a corresponding lateral arm 63 on the bearing ring 4 of the adjacent turn-table 3. Just below the guide-way 57 the arm 61 is provided with a rack 64 which is engaged by a pinion 65 at the pivot end of a hand lever 66. With this construction it will be obvious that when the hand lever is manipulated the slide 58 and pattern plate 59 are reciprocated transversely of the mechanism and at the same time the turn-tables are oscillated through the action of the arms 61 and 63. As will be hereinafter described, this oscillating movement of the turn-tables is controlled by the pattern plate.

The pattern plate 59 has an opening or depression 59$^a$ therein which has the same shape or configuration as the cuts which it is desired to produce in the tire mold sections A. A follower pin 67 projects into the opening of the pattern plate 59, being shown as carried by the lower end of a vertical bar 68, which is adjustably secured by means of a clamp 69 to the forward section 70$^a$ of the cutter controlling bar, the rear section 70$^b$ of the said bar being adjustably secured to the section 70$^a$. The meeting ends of the sections 70$^a$ and 70$^b$ of the cutter controlling bar are each formed with a transverse head 71, said heads being slotted and connected by clamping bolts 72 which extend through the slots. The two sections 70$^a$ and 70$^b$ of the bar can thus be rigidly connected and held either in alignment with each other or in an off-set relation, the latter adjustment being necessary when the cutter carrying frames 39 are at different elevations. The end of the section 70$^a$ of the bar to which the vertical bar 68 of the follower pin is clamped passes through a guide 73 and is formed with a rack 74 which is engaged by a pinion 75. This pinion is rigid with the pivot end of a hand lever 76 so that by swinging the hand lever the cutter shifting bar can be reciprocated back and forth, the movements of the bar being limited by the engagement of the follower pin 67 with the walls of the opening 59$^a$ of the pattern plate.

The tire mold sections A, or other articles to be cut or engraved by the machine, are mounted upon the respective turn-tables 3 and oscillated with the turn-tables in a horizontal plane. The distance between the pivot centers 43 of the cutters is equal to the distance between the centers of the turn-tables, and after the tire mold sections have been clamped upon the turn-tables the main carriage 32 is shifted horizontally upon the rail 31 until the cutters are brought into proper position over the respective tire mold sections. The cutter carrying frames 39 may then be vertically adjusted to bring the cutters into engagement with the work, whereupon the sections 70$^a$ and 70$^b$ of the cutter moving bar are clamped together by tightening the bolts 72. With the pattern plate in position and the follower pin 67 projecting into the opening of the pattern plate, the cutters are caused to operate. The turn-tables are oscillated in a horizontal plane by means of the hand lever 66, the degree of movement being determined by engagement of the end walls of the opening in the pattern plate with the follower pin as the pattern plate is moved back and forth. Simultaneously the operator moves the hand lever 76 and reciprocates the cutter moving bar, whereupon the cutters are moved in a vertical plane at substantially right angles with the plane of movement of the tire mold sections. The amplitude of movement of the cutter moving bar is governed by engagement of the follower pin with the side walls of the opening in the pattern plate. The movements of the turn-tables and cutters are thus controlled from the pattern plate, so that a depression corresponding exactly to the shape of the opening in the pattern plate will be cut in each of the tire mold sections. There is a positive connection between the two turn-tables and also between the two cutting mechanisms, so that two of the tire mold sections can be effectively engraved at the same time, and there is no lost motion or loose connection which would tend to make the cutting of the second tire mold section less accurate or positive than of the first tire mold section. When the design of the pattern plate has been cut in each of the tire mold sections, the turn-tables are rotated, as has been previously described, to bring a fresh portion of each of the tire mold sections under the cutters. The cutting operation is then repeated and this is done until the design has been reproduced at proper intervals around the entire periphery of the tire mold sections. In the event it should be desired to cut a design upon the inner periphery of the tire mold sections, the main carriage 32 can be moved horizontally upon the rail 31 to bring the cutters in position over diametrically opposite portions of the tire mold sections, thereby causing each cutter to assume the position which is indicated by dotted lines at the right hand end of Figure 1. It is frequently necessary to cut the tire mold sections at this point, and a lot of expensive hand work can be avoided by the present construction which enables this to be done by the same machine which is used for cutting the depressions in the tread forming portions or the mold sections. When the main carriage is moved into position to enable the cutters to operate upon the inner periphery of the tire mold, as just described, a longer bar member 70$^a$ is substituted for the short form of the bar member shown on the drawings.

As shown on the drawings, the opening 59$^a$ of the pattern plate has the shape of a diamond, and the depressions B in the pattern plate, Figure 4, are similar in shape but smaller in size. Any other desired shape of opening might be formed in the pattern plate and would be duplicated in the tire mold sections.

A modified form of the invention is shown by Figures 11 to 13 in which the pattern plate 59 instead of being movable is rigidly mounted upon a small shelf 77 which is arranged at the left-hand end of the machine. The follower pin 78 is carried by a block 79 which is adjustably mounted in slotted arms 80 and 81 which are arranged at right angles to each other. The top and bottom of the block 79 are formed with the ribs 79$^a$, see Figure 13, which are arranged at right angles to each other and fit within the slots of the respective arms 80 and 81, being freely slidable therein. The slotted arm 80 projects from a rack 82 which is engaged by a pinion 83, said pinion being rigid with the pivot end of a hand lever 84 so that by manipulating the hand lever the slotted arm is moved in a direction transverse to itself. The amplitude of movement which is possible being determined by the engagement of the follower pin 78 with the side walls of the opening 59$^a$ in the pattern plate. A slotted bracket 85 projects upwardly from the arm 80 and has the section 70$^a$ of the cutter moving bar connected thereto by means of a bolt 86. The end of the slotted arm 81 is extended downwardly at 81$^a$ and connected by a link 87 to one arm of a bell crank lever 88 which is suitably mounted upon the main supporting frame. The downwardly extended arm 81$^a$ of the slotted arm 81 has a suitable rack and pinion connection 89 with a hand lever 90 and is mounted upon a guide-way 91 which directs it in its movements. By manipulating the hand lever 90 the slotted arm 81 is movable in a direction transverse to itself, the degree of movement being determined by engagement of the follower pin 78 with the walls of the opening 59$^a$ in the pattern plate.

The other arm of the bell crank lever 88 is forked and pivotally engages a sleeve 92 which is loosely mounted upon the worm shaft 11 and confined between collars 93 which are applied to the worm shaft. Movements of the bell crank lever are thus transmitted through the worm shaft and worm gearing to oscillate the turn-tables so that the necessity of providing another connection between the turn-tables for this purpose is avoided. The operation of this modified form of the device is very similar to that previously described. The two slotted arms 80 and 81 are both mounted for movement in directions transverse to themselves and the movements of the arms are limited by engagement of the follower pin 78 with the opening 59ª of the pattern plate. The slotted arm 80 is directly connected with the section 70ª of the cutter moving bar and operates to swing the cutters in a vertical plane, while the slotted arm 81 is connected to the bell crank lever 90 and operates through the said bell crank lever and the worm gear to oscillate the turn-tables in a horizontal plane. As the result of the horizontal oscillation of the turn-tables and the vertical oscillation of the cutters, both of which movements are governed by the pattern plate, figures corresponding to those of the pattern plate are caused to be cut in the tire mold sections. When one set of figures has been cut in the tire mold sections the indexing mechanism previously described can be manipulated to rotate the turn-tables and bring fresh portions of the tire mold sections into position under the cutters. This modified construction also provides an effective and positive means whereby two or more of the tire mold sections can be cut simultaneously without any looseness or play between the cutting mechanisms which would cause some of the mold sections to be cut or engraved with less accuracy than the other mold sections. While the invention has been specifically described for use in engraving or cutting suitable configurations on the inner faces of tire molds so that the molds can be used for the manufacture of tires and irregular non-skid surfaces, it will be understood that the machine can be used for cutting or engraving any articles having similar surfaces to be operated upon. The engraving of two or more mold sections at the same time with the present machine is made possible by reason of the fact that the cutting mechanisms have a positive connection which avoids any inaccuracy due to yielding or give of the metal which might be possible where the parts are subjected to torsion or bending strains.

Figures 7, 8:
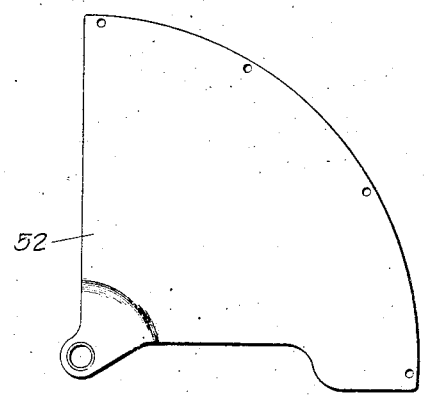
Figure 7 is a detail view of the segmental cover plate.
Figure 8 is a sectional view through the cutter arm on the line 8—8 of Fig. 6.
Figure 9:
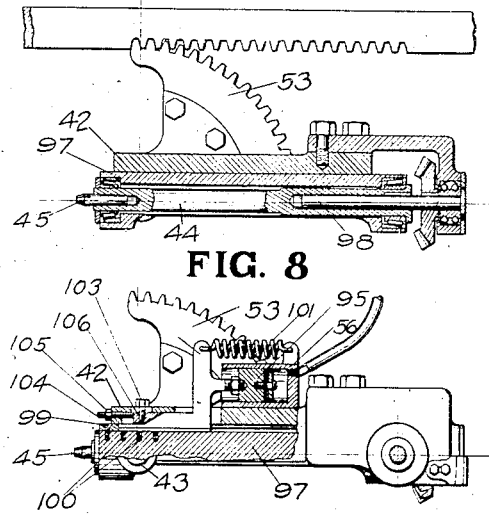
Figure 9 is a segmental view on the line 9—9 of Fig. 6.
Figure 10:
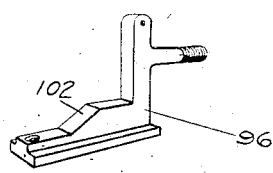
Figure 10 is a detail view of the connecting link between the piston of the air cylinder and the slide which carries the cutter shaft.

Referring to Figure 9 of the drawings, the numeral 95 designates the piston which is slidably mounted within the air cylinder and connected by an L-shaped link 96 which is shown in detail by Figure 10, to the slide 97 which is mounted upon the cutter arm 42 and has the cutter shaft 44 journaled therein. The cutter shaft, as shown by Figure 8, has a feather and spline connection with a shaft 98 on one of the bevel gears 46. The end of the link 96 has an opening receiving a screw 99 which may be engaged with any selected one of a series of openings 100 in the slide 97, thereby providing for adjustment in the connection. A spring 101 connects the upper end of the L-shaped link to a lug on the air cylinder and normally tends to retract the cutter.

A beveled surface 102 on the link 96 is arranged for engagement with a correspondingly beveled block 106 when the cutter has been projected to the limit of its movement. The parts are then wedged together and the link forced tightly against the slide so that all looseness or play is taken up. This results in holding the cutter securely in position without any play or wabbling, and an accurate cutting of the design is thereby obtained. The beveled block 106 is adjustable so that it can be properly set for cutting at different depths. It is adjustably secured to the top wall of the cutter arm 42 by means of a screw 103, said screw being received within a slot in the cutter arm so that when the screw is loosened the block can be adjusted longitudinally. To facilitate adjustment of the block an adjusting screw 104 is connected thereto and extends through the end of the cutter arm where it is provided with a nut 105. The block can be set at the proper position so that when the cutter has been projected the maximum distance by the air cylinder the beveled face 102 of the link 96 will engage the beveled face of the block 106 and cooperate therewith to wedge the parts together and take up any looseness or play.

Having thus described my invention what I claim as new and desire to secure by Letters Patent is:

1. A machine for simultaneously engraving a plurality of annular objects, including a plurality of horizontally disposed turn-tables for supporting the annular objects, bearing rings upon which the turn-tables are mounted, means for releasably clamping the turn-tables to the bearing rings, connecting means between the bearing rings for causing them to move in unison, means for moving the turn-tables on the bearing rings when they are released, means for oscillating the bearing rings, cutting tools pivotally mounted to swing in arcs transverse to the turn-tables, connecting means between the cutting tools for swinging the same in unison, a pattern plate, and means cooperating therewith to control the oscillation of the bearing rings and the swinging movements of the cutting tools.

2. A machine for simultaneously engraving a plurality of annular objects, including a plurality of turn-tables for supporting the annular objects, bearing rings for the turn-tables, means for releasably clamping the turn-tables to the bearing rings, gear rings on the turn-tables, slidably mounted gear members engaging the gear rings for simultaneously moving the turn-tables when they are released from the bearing rings, said gear members sliding back and forth as the turn-tables are oscillated, connecting means between the bearing rings for causing them to oscillate in unison, means for oscillating the bearing rings, cutting tools arranged opposite the respective turn-tables and pivotally mounted to swing in arcs transverse to the turn-tables, connecting means between the cutting tools for swinging the same in unison, a pattern plate, and means cooperating with the pattern plate to control the oscillation of the bearing rings and swinging movements of the cutting tools.

3. A machine for simultaneously engraving a plurality of annular objects, including a plurality of turn-tables for supporting the annular objects, bearing rings for the turn tables, means for releasably clamping the turn-tables to the bearing rings, gear rings on the turn-tables, gear members engaging the gear rings for advancing the turn-tables when they are released from the bearing rings, slidably mounted bearings for the gear members, interlocking gear members between the slidably mounted bearings and the respective bearing rings whereby the said bearings slide back and forth when the bearing rings are oscillated, connecting means between the bearing rings for causing them to oscillate in unison, means for oscillating the bearing rings, cutting tools arranged opposite the respective turn-tables and pivotally mounted to swing in arcs transverse thereto, connecting means between the cutting tools for causing them to swing in unison, a pattern plate, and means cooperating with the pattern plate to control the oscillation of the bearing rings and the swinging movements of the cutting tools.

4. A machine for simultaneously engraving a plurality of annular objects, including a plurality of horizontally disposed turn-tables for supporting the annular objects, connecting means between the turn-tables for causing the same to oscillate in unison, means for oscillating the turn-tables, a main carriage mounted to slide horizontally above the turn-tables, a plurality of cutter carrying arms fixedly mounted upon the main carriage and spaced apart to correspond to the distances between the turn-tables and pivotally mounted to swing in planes transverse to the turn-tables, connecting means between the cutter carrying arms for swinging the same in unison, a pattern plate, and means cooperating with the pattern plate to control the oscillation of the turn-tables and the swinging movements of the cutter carrying arms.

5. A machine for simultaneously engraving a plurality of annular objects, including a plurality of horizontally disposed turn-tables for supporting the annular objects, connecting means between the turn-tables for causing them to oscillate in unison, means for oscillating the turn-tables, a main carriage adjustably mounted for horizontal sliding movement above the turn-tables, a plurality of cutter carrying frames mounted upon the main carriage for vertical movement toward and away from the turn tables and said cutter carrying frames, cutter carrying arms pivotally mounted upon the said frames to swing in planes transverse to the turn-tables, connecting means between the several cutter carrying arms to swing the same in unison, a pattern plate, and means cooperating with the pattern plate to govern the oscillation of the turn-tables and the swinging movements of the cutter carrying arms.

6. A machine for simultaneously engraving a plurality of annular objects, including a plurality of horizontally disposed turn-tables for supporting the annular objects, means for oscillating the turn-tables in unison, a cutter carrying frame for each turn-table, cutters pivotally mounted thereon to swing in arcs transverse to the turn-tables, a horizontally reciprocating bar for swinging each cutter, an adustable connection between the bars whereby they may be connected either in or out of alinement with each other, means for actuating the bars for simultaneous movement of the cutters, a pattern plate, and means cooperating with the pattern plate for governing the oscillation of the turn-tables and the reciprocation of the horizontal bars of the cutters.

7. A machine for simultaneously engraving a plurality of annular objects, including a plurality of horizontally disposed turn-tables for supporting the annular objects, means for simultaneously oscillating the turn-tables, a cutter carrying frame provided for each turn-table and mounted for vertical adjustment relative thereto, cutters carried by the respective frames and pivotally mounted to swing in arcs transverse to the turn-tables, horizontally reciprocating cutter actuating bars for the respective cutters, means for adjustably connecting the cutter actuating bars to allow for relatively vertical adjustment of the cutter carrying frames, means for moving the cutter actuating bars for simultaneous movement of the cutters, a pattern plate, and means cooperating therewith to control the oscillation of the turn-tables and movements of the cutter actuating bars.

8. A machine for simulaneously engraving a plurality of annular objects, including a plurality of horizontally disposed turn-tables for supporting the annular objects, means for simultaneously oscillating the turn-tables, a cutter carrying frame for each turn-table, means for vertically adjusting the cutter carrying frames toward and away from the turn-tables, cutters carried by the frames and pivotally mounted to swing in arcs transverse to the turn-tables, horizontally reciprocating bars operatively connected to the respective cutters for swinging the same, means for adjustably connecting the ends of the reciprocating bars to compensate for different adjustments of the cutter carrying frames, means for reciprocating the bars to simultaneously swing the cutters, a pattern plate, and means cooperating with the pattern plate to control the oscillation of the turn-tables and the movements of the reciprocating bars.

9. A machine for simultaneously engraving a plurality of annular objects, including a plurality of turn-tables for supportng the annular objects, lateral arms rigid with the turn-tables a bar pivotally connecting the lateral arms for causing the turn-tables to oscillate in unison and operating by pushing and pulling, a cutter frame for each turn-table, cutter carrying arms pivotally mounted thereon to swing in planes transverse to the turn-tables, a reciprocating bar operatively connected to the cutter carrying arms for simultaneously swinging the same, a slidably mounted pattern plate support, an operative connection between the same and one of the turn-tables, and a follower pin carried by the reciprocating bar and adapted to engage the pattern plate.

10. A machine for simultaneously engraving a plurality of annular objects, including a plurality of turn-tables for supporting the annular objects, means for connecting the turn-tables to oscillate in unison, a cutter frame for each turn-table, cutter carrying arms pivotally mounted upon the respective cutter frames and arranged to swing in planes transverse to the turn-tables, segmental racks upon the cutter carrying arms, a rack bar engaging the segmental racks for simultaneously swinging the cutter carrying arms, a pattern plate support, a guide-way upon which the pattern plate support is slidably mounted, a lateral arm projecting from the pattern plate support and operatively connected to one of the turn-tables, and a follower pin carried by the rack bar and adapted to engage the pattern plate for cooperation therewith to govern the movements of the pattern plate support and reciprocating bar.

11. A machine for engraving an annular object, including a turn-table to support the object, means for oscillating the turn-table, a cutter arm pivoted to swing in a plane transverse to the turn-table, a segmental rack rigid with the cutter carrying arm and arranged in the plane in which the arm swings, a reciprocating rack bar and arranged in the plane of and engaging the segmental rack to swing the cutter arm, a pattern plate, and means cooperating with the pattern plate to govern the oscillation of the turn-table and the reciprocation of the rack bar.

12. A machine for engraving an annular object, including a turn-table to support the object, a cutter carrying frame pivotally mounted to swing in a plane transverse to the turn-table, a segmental rack rigid with the cutter carrying arm and arranged in the plane in which the arm swings, a reciprocating rack bar arranged in the plane of and engaging the segmental rack, a pattern plate support, a guideway upon which the pattern plate support is slidably mounted, an operative connection between the pattern plate support and the turn-table, and a follower pin carried by the rack bar for cooperation with the pattern to govern the movements of the rack bar and pattern plate support, the rack bar being subjected only to a pushing and pulling action.

13. A machine of the character described, including a cutter arm, a slide thereon, a cutter carried by the slide, a link connected to the slide for moving the same to advance the cutter, and wedge means cooperating with the link to lock the parts against play when the cutter is in operative position.

14. A machine of the character described, including a cutter arm, a slide thereon, a cutter carried by the slide, a link connected to the slide for advancing the cutter, said link being formed with a beveled face, and a block having a correspondingly beveled face adapted to cooperate therewith to lock the parts against looseness when the cutter is in operative position.

15. A machine of the character described, including a cutter arm, a slide thereon, a cutter carried by the slide, a link connected to the slide for moving the same to advance and retract the cutter, said link being formed with a beveled face, a block having a beveled face which is arranged for cooperation with the beveled face of the link to lock the parts against looseness when the cutter is in operative position, and means for adjusting the position of the block.

16. A machine for simultaneously engraving a plurality of annular objects, including a plurality of horizontally disposed turntables for supporting the annular objects, means connecting the turn-tables to cause them to oscillate in unison, cutting tools pivotally mounted to swing in the same vertical plane and operate in arcs transverse to the motion of the turn-tables, connecting means between the cutting tools for simultaneously moving the same including a reciprocating bar which operates by pulling and pushing, a pattern plate, and means cooperating therewith for controlling the movements of the turn-tables and reciprocating bar.

17. A machine for simultaneously engraving a plurality of annular objects including a plurality of horizontally disposed turn-tables, means for simultaneously oscillating the turn-tables, a main carriage mounted for horizontal movement above the turn-tables, cutter frames adjustably mounted upon the main carriage for vertical movement toward and away from the turn-tables, cutter carrying arms pivotally mounted upon the cutter frames and arranged to swing in planes transverse to the turn-tables, a segmental rack rigid with each cutter carrying arm and arranged in the plane in which the arm swings, a horizontally reciprocating rack bar engaging the segmental racks to cause simultaneous swinging of the cutter carrying arms, a pattern plate, and means cooperating with the pattern plate to govern the oscillation of the turn-tables and the reciprocation of the rack bar.

18. Engraving mechanism comprising a pair of units disposed horizontally spaced from each other in tandem and alined and each comprising a work support, a cutter, and means supporting said work support and said cutter for relative movement two-dimensional along the surface of the blank being engraved; a single actuating means connected to said units in tandem for effecting such movement in all of said units in unison; and a single control means comprising cooperating pattern members and effective to limit the operations of said actuating means to produce such movement only within the limits of a design predetermined by the cooperating characteristics of said pattern members.

19. Engraving mechanism comprising a pair of units disposed horizontally spaced from each other in tandem and alined and each comprising a work support, a cutter, and means supporting said work support and said cutter for relative movement two-dimensional along the surface of the blank being engraved but limited in extent to provide only for engraving over a limited area; and a single spacing means connected to said units in tandem for periodically effecting additional such relative movement in all of said units in unison to thus periodically space all of said units in unison for successively engraving additional areas.

20. Engraving mechanism comprising a pair of units disposed horizontally spaced from each other in tandem and alined and each comprising a work support, a cutter, and means supporting said work support and said cutter for relative movement two-dimensional along the surface of the blank being engraved but limited in extent to provide for engraving over only a limited area; a single control means comprising cooperating pattern members and effective to limit the operations of said actuating means to produce such movement within such area only within the limits of a design predetermined by the cooperating characteristics of said pattern members; and a single spacing means connected to said units in tandem for producing additional such relative movement in all of said units in unison for successively engraving such design on successive areas.

21. Engraving means comprising a plurality of units disposed horizontally spaced from each other, in tandem and alined and each comprising a work support, a cutter, and means supporting said work support and said cutter for relative movement two-dimensional along the surface being engraved; a single actuating means connected to said units in tandem for effecting such relative movement in all of said units in unison, but only to a limited extent for engraving over a limited area; and a single spacing means interposed between said actuating means and each of said units and effective to continue periodically, in all of said units in unison, a movement produced by said actuating means, to thus periodically space all of said units in unison for the engraving in unison of successive areas.

22. Engraving mechanism comprising a pair of units disposed horizontally spaced from each other in tandem and alined and each comprising a rotary work support and a cutter mechanism movable transversely to produce relative movement between said cutter mechanism and said work support two-dimensional along the surface being engraved; a first actuation means for effecting such work support actuating in all of said units in unison; and a second actuating means for effecting such cutter mechanism movement in all of said units in unison, comprising reciprocating coordinating means connected to each of said cutter mechanisms and effective to move all of said cutter mechanisms in unison upon reciprocation of said coordinating means.

23. Engraving mechanism comprising a pair of units disposed horizontally spaced from each other in tandem and alined and each comprising a rotary work support and a cutter mechanism comprising an operating sector and movable transversely to produce relative movement between said cutter mechanism and said work support two-dimensional along the surface being engraved; a first actuating means for effecting such work support actuation in all of said units in unison; and a second actuating means for effecting such cutter mechanism movement in all of said units in unison, comprising rack means connected to each of said cutter mechanism operating sectors and effective to move all of said cutter mechanisms in unison upon reciprocation of said rack means.

24. Engraving mechanism comprising a pair of units disposed horizontally spaced from each other in tandem and alined and each comprising a rotary work support and a cutter mechanism movable transversely to produce relative movement between said cutter mechanism and said work support two-dimensional along the surface being engraved; a first actuating means for effecting such work support actuation in all of said units in unison, comprising reciprocating means operatively connected to each of said work supports and effective to rotate all of said work supports in unison upon reciprocation of said reciprocating means; and a second actuating means for effecting such cutter mechanism movement in all of said units in unison, comprising reciprocating coordinating means connected to each of said cutter mechanisms and effective to move all of said cutter mechanisms in unison upon reciprocation of said coordinating means.

25. Engraving mechanism comprising a pair of units disposed horizontally spaced from each other in tandem and alined and each comprising a rotary work support and a cutter mechanism comprising an operating sector and movable transversely to produce relative movement between said cutter mechanism and said work support two-dimensional along the surface being engraved; a first actuating means for effecting such work support actuation in all of said units in unison, comprising reciprocating means operatively connected to each of said work supports and effective to rotate all of said work supports in unison upon reciprocation of said reciprocating means; and a second actuating means for effecting such cutter mechanism movement in all of said units in unison, comprising rack means connected to each of said cutter mechanism operating sectors and effective to move all of said cutter mechanisms in unison upon reciprocation of said rack means.

In testimony whereof I affix my signature.

ROBERT S. BOYLE.